United States Patent Office 3,330,386
Patented July 11, 1967

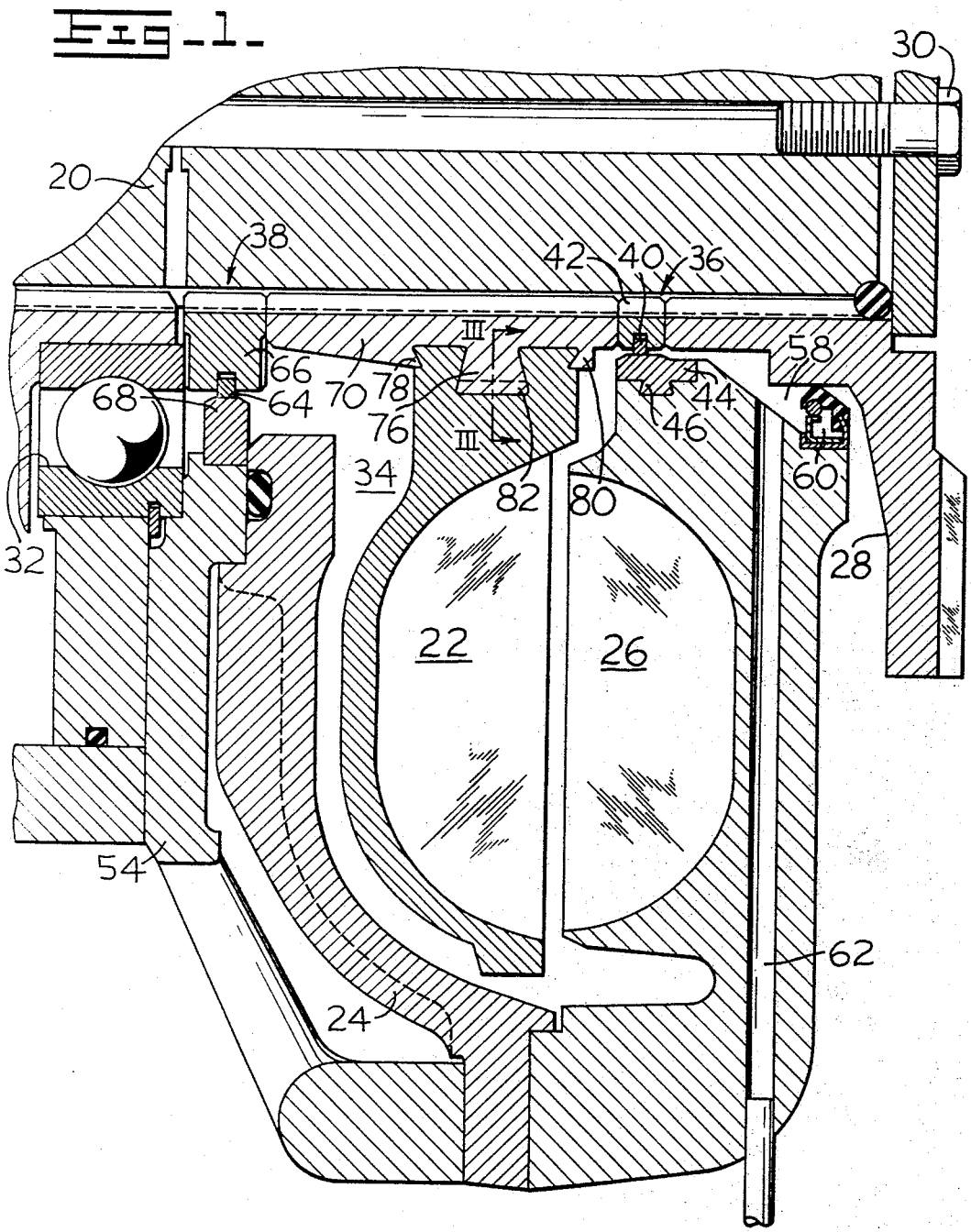

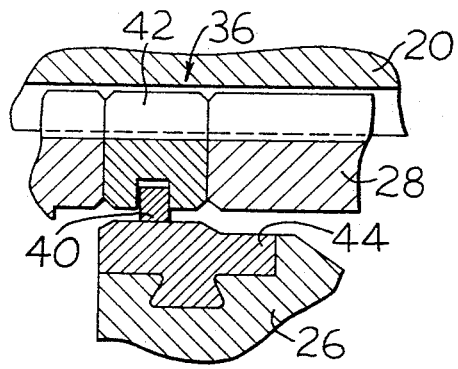
Fig-2-
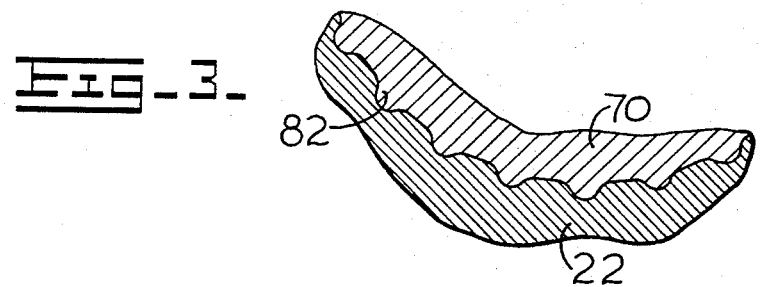
Fig-3-
Fig-4-
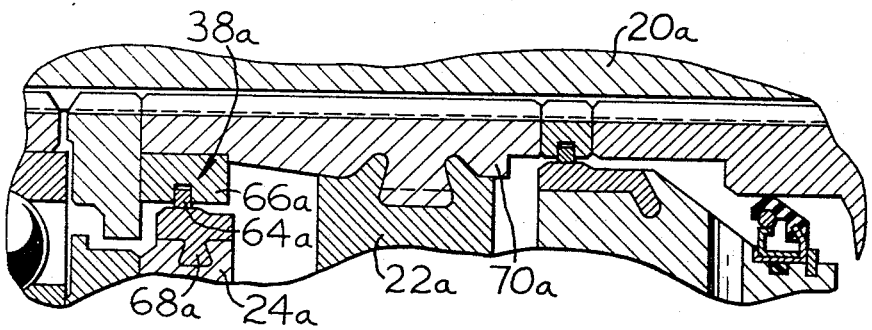
INVENTORS
AUGUST H. BERTRAM
NORMAN E. RISK
ALFRED W. SIEVING
ATTORNEYS

3,330,386
SEALING ARRANGEMENT FOR RETARDER SYSTEM
August H. Bertram, Decatur, Norman E. Risk, Peoria, and Alfred W. Sieving, Decatur, Ill., assignors to Caterpillar Tractor Co., Peoria, Ill., a corporation of California
Filed Mar. 21, 1966, Ser. No. 535,837
3 Claims. (Cl. 188—90)

This invention relates to fluid retarders of the kind employed to augment the action of brakes on large machines.

Retarders operate under high pressures and usually leak considerably. This creates a necessity for frequently replacing oil in the system which is a time consuming operation. Furthermore, failure to replace the oil results in faulty operaton.

It is, therefore, an object of the inevntion to provide a retarder system with an improved sealing arrangement and construction which will substantially eliminate the aforementioned problems encountered with prior art systems.

Further and more specific objects and advantages of the invention are made apparent in the following specification wherein the invention is described in greater detail with reference to the accompanying drawings.

In the drawings:

FIG. 1 is a schematic sectional view of a retarder system in accordance with the present invention;

FIG. 2 is an enlarged sectional view illustrating in detail the sealing arrangement of the present invention;

FIG. 3 is a cross sectional view taken on the line III—III of FIG. 1; and

FIG. 4 is an enlarged sectional view illustrating a modified embodiment of the sealing arrangement of the present invention.

Referring to FIG. 1, a rotatable externally splined shaft 20 is shown in assembled relation with respect to the surrounding casing of a conventional retarder or hydrodynamic brake. In general, the retarder comprises a rotor 22 surrounded by a casing including rotor back-up member 24, stator 26 and an output flange 28. The rotor, rotor back-up member and stator are preferably constructed of aluminum. A bolt clamping arrangement 30 cooperates with output flange 28 to clamp the assembly in aligned position with the inner race of an anti-friction bearing assembly 32.

In operation, fluid is admitted to a cavity 34 of the retarder assembly and the opposed vanes or blades on rotor 22 and stator 26 create a resistance to movement of the rotor which is connected indirectly with the wheels of a vehicle. Retarders operate under high pressures and to prevent faulty operation due to fluid leakage a suitable sealing arrangement must be provided. The present invention comprises a novel construction and arrangement of piston ring seals 36 and 38 to keep the leakage problem within tolerable limits.

The seal assembly 36 comprises a high hardness piston ring 40 fitted within an adapter or carrier 42 which is received on the splined shaft 20 for rotation therewith. Because the high hardness piston ring 40 would soon wear into the aluminum surface of stator 26 it is necessary to provide a wear-resistant insert 44 which is preferably constructed of cast iron or similar material. However, due to the fact that great temperature increases are often experienced during the operation of a retarder, the cast iron insert 44 cannot be simply pressed into the aluminum part because the coefficients of expansion of the two metals are dissimilar. The insert 44 is provided with an annular flaring shoulder or tenon 46 so that rigid interlocking of the two components is assured. The two parts are assembled while hot and since aluminum has the greater expansion rate it seizes the insert as it cools and permanently holds it in place.

As best shown in FIG. 2, when the inner chamber of the retarder is pressurized, the piston ring 40 is expanded against insert 44 and held stationary. Carrier 42 is driven and rotates with the shaft. Sealing is accomplished by ring 40 being pushed against the side of the groove in carrier 42 and seating against the insert 44 thereby preventing oil from passing through. A limited amount of leakage, which is normal with piston ring seals, is confined within a compartment 58 by a conventional lip-type seal 60 which is fixed to stator 26 and mates against the output flange 28. A drainage line 62 returns fluid from this compartment to a torque divider sump (not shown).

The seal assembly 38 closes off the other side of compartment 34 and is similar in all material respects to seal assembly 36. A piston ring 64 within a carrier 66 mates with a cast iron insert 68 which is pressed into a cast iron adapter 54. Leakage from compartment 34 returns directly to the torque divider sump (not shown).

The carriers 42 and 66 are made as separate parts so that they may be replaced as wear occurs. The tapered edges of the inserts 44 and 68 allow the piston rings and their respective carriers to be inserted into the assembly without the use of ring compressors. It is customary to use a 30° taper, but the angle is not critical. In addition, the inserts 44 and 68 may vary somewhat in material composition and hardness to provide the optimum seating surface for rings 40 and 64, respectively.

A further aspect of the invention involves the use of a relatively large cast iron insert 70 on the inner diameter of the aluminum retarder rotor 22. It has been found that the clamping force between tightening bolt 30 and bearing assembly 32 tends to relax or loosen due to fretting and wear between the ends of the rotor hub and the adjacent pieces when utilizing an aluminum rotor. As previously noted the splined shaft 20 and all parts retained on this shaft are preferably constructed of a hard metal, such as steel, with the exception of the rotor 22 which is preferably aluminum. Consequently, as the temperature increased to a range around 350° F. during operation of the retarder assembly, the different expansion rates between the steel shaft and aluminum rotor hub caused working of the metal on the ends of the rotor hub and additionally resulted in a pressure build-up great enough to yield the aluminum where the hub mated with the shaft. After this cycle was repeated many times, the fretted rotor hub vibrated through the backlash of the splined teeth to such an extent that the bolt 30 lost its effectiveness as a clamping member and this ultimately caused failure of the bearing 32. The cast iron insert or rotor hub 70 eliminates the aforementioned problems since it has an expansion rate almost equal to that of steel.

The insert 70 is coupled to the rotor 22 with a large central annular flaring tenon 76 and with outer half tenons 78 and 80. As best shown in FIG. 3 lugs 82 are incorporated between the rotor 22 and insert 70. During operation of the retarder, the rotor tends to hydraulically couple itself to the stator so that large values of torque are transmitted to shaft 20 by the insert 70. By providing the driving lugs 82, the bond between insert 70 and rotor 22 is not required to transmit this force.

The modified construction shown in FIG. 4 is basically the same as that depicted in FIG. 1. However, the seal assembly 38a has been slightly relocated such that the carrier 66a is now a part of the rotor insert 70a and the piston ring 64a seats against a hardened insert 68a affixed to the rotor backup member 24a.

We claim:
1. A retarder system for a vehicle comprising a casing, a shaft passing therethrough, at least one wall of said casing comprising a bladed stator, a rotor secured to said shaft and having radially extending blades confronting said stator and rotatable in the space defined by said casing, fluid sealing means interposed between said casing and said shaft on each side of the juncture of said rotor with said shaft, said sealing means comprising a removable adapter secured to said shaft and rotatable therewith, said adapter being separable from both said rotor and said shaft, a hard annular piston ring extending from a groove formed in the radially outer surface of said adapted, and a hardened wear insert positioned in said casing and adapted to be sealingly engaged by said piston ring to insure that the compartment defined by said casing is substantially fluid tight.

2. A retarder system as set forth in claim 1 wherein said rotor and said casing components are constructed of aluminum and said hardened wear inserts are constructed of cast iron, said cast iron inserts further having an annular radially outwardly flared tenon received within a mating groove formed in said casing.

3. A retarder system as set forth in claim 2 wherein said shaft is splined and said rotor is provided with a hardened metal hub for connection thereto, said hub being joined to said rotor by annular radially flared tenon means, and cooperating lug means formed between said tenon means and said rotor.

References Cited
UNITED STATES PATENTS

| | | |
|---|---|---|
| 2,287,084 | 6/1942 | Bennett. |
| 2,827,989 | 3/1958 | Christenson. |
| 3,171,513 | 3/1965 | Black et al. -------- 60—54 X |

MILTON BUCHLER, *Primary Examiner.*

G. E. A. HALVOSA, *Assistant Examiner.*